(12) United States Patent
Hauk et al.

(10) Patent No.: US 11,028,936 B2
(45) Date of Patent: Jun. 8, 2021

(54) THERMOSTATIC VALVE FOR AN INTERNAL COMBUSTION ENGINE

(71) Applicant: ILLINOIS TOOL WORKS INC., Glenview, IL (US)

(72) Inventors: Torsten Hauk, Neustadt (DE); Carsten Heldberg, Kirchlinteln (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/464,520

(22) PCT Filed: Dec. 7, 2017

(86) PCT No.: PCT/US2017/065048
§ 371 (c)(1),
(2) Date: May 28, 2019

(87) PCT Pub. No.: WO2018/111672
PCT Pub. Date: Jun. 21, 2018

(65) Prior Publication Data
US 2019/0309872 A1 Oct. 10, 2019

(30) Foreign Application Priority Data

Dec. 12, 2016 (DE) .................... 10 2016 124 058.3
Dec. 16, 2016 (DE) .................... 10 2016 124 675.1

(51) Int. Cl.
*F16K 31/02* (2006.01)
*F16K 1/12* (2006.01)
*F01P 7/16* (2006.01)

(52) U.S. Cl.
CPC ............ *F16K 31/025* (2013.01); *F01P 7/167* (2013.01); *F01P 2025/08* (2013.01); *F01P 2070/04* (2013.01); *F16K 1/12* (2013.01)

(58) Field of Classification Search
CPC .. F16K 31/025; F16K 1/38; F16K 1/12; F01P 7/167; F01P 2070/04; F01P 2025/08
See application file for complete search history.

(56) References Cited

U.S. PATENT DOCUMENTS 2,725,212 A * 11/1955 Jensen ................... F02M 19/04
251/122
4,190,198 A * 2/1980 Casuga .................. F01M 5/007
236/34.5

(Continued)

FOREIGN PATENT DOCUMENTS

| CN | 1233709 A | 11/1999 |
| CN | 1854575 A | 11/2006 |

(Continued)

OTHER PUBLICATIONS

PCT, International Preliminary Report on Patentability (Chapter 1) Written Opinion of the International Searching Authority, International Application No. PCT/US2017/065048; dates Jun. 18, 2019, 8 pages.

(Continued)

*Primary Examiner* — Umashankar Venkatesan
(74) *Attorney, Agent, or Firm* — Thompson Hine LLP

(57) ABSTRACT

A thermostatic valve for an internal combustion engine, including a housing with a plurality of coolant connections for connection to a coolant circuit of the internal combustion engine, a valve element which is mounted movably in the housing such that a movement of the valve element, at least two coolant connections of the housing are either connectable to one another or separable from one another, an expansion element which is arranged in order, during the operation of the internal combustion engine, to enter into thermal contact with coolant circulating in the coolant circuit, wherein, in the event of a heat-induced expansion, the expansion element moves the valve element in the (Continued)

housing in order to connect the at least two coolant connections, wherein a controllable heating device is provided such that the expansion element can be heated in order to move the valve element.

11 Claims, 3 Drawing Sheets

(56) References Cited

U.S. PATENT DOCUMENTS

| | | | | |
|---|---|---|---|---|
| 5,791,557 | A * | 8/1998 | Kunze | G05D 23/1333 236/34.5 |
| 6,253,837 | B1 * | 7/2001 | Seiler | G05D 23/134 165/103 |
| 7,540,431 | B2 * | 6/2009 | Kozdras | F28F 27/02 236/93 R |
| 8,123,143 | B2 * | 2/2012 | Willers | G05D 23/1333 236/101 A |
| 8,141,790 | B2 * | 3/2012 | Sheppard | F01P 7/16 236/34.5 |
| 8,991,719 | B2 * | 3/2015 | Sheppard | F01M 5/007 236/34.5 |
| 9,541,211 | B2 * | 1/2017 | Qiu | G05D 23/1333 |
| 2005/0006487 | A1 | 1/2005 | Suda | |
| 2008/0135633 | A1 * | 6/2008 | Heldberg | G05D 23/022 236/34.5 |
| 2009/0026405 | A1 * | 1/2009 | Sheppard | G05D 23/1333 251/364 |
| 2009/0114169 | A1 * | 5/2009 | Heldberg | F16K 31/002 123/41.1 |
| 2015/0053879 | A1 | 2/2015 | Pettinaroli | |
| 2015/0123023 | A1 | 5/2015 | Heldberg | |
| 2015/0277453 | A1 * | 10/2015 | Yajima | F16K 17/048 236/93 R |
| 2016/0047293 | A1 | 2/2016 | Gonze | |

FOREIGN PATENT DOCUMENTS

| | | |
|---|---|---|
| DE | 102006038213 B4 | 11/2010 |
| DE | 102012013677 | 1/2014 |
| DE | 102015113200 | 2/2016 |
| EP | 0333687 | 9/1989 |
| EP | 1207283 | 5/2002 |
| EP | 2529937 B1 | 3/2015 |
| EP | 2886822 | 6/2015 |
| JP | 2015194100 A | 11/2015 |

OTHER PUBLICATIONS

PCT, International Search Report and Written Opinion, International Application No. PCT/US2017/065048; dated Mar. 7, 2018, 12 pages.

* cited by examiner

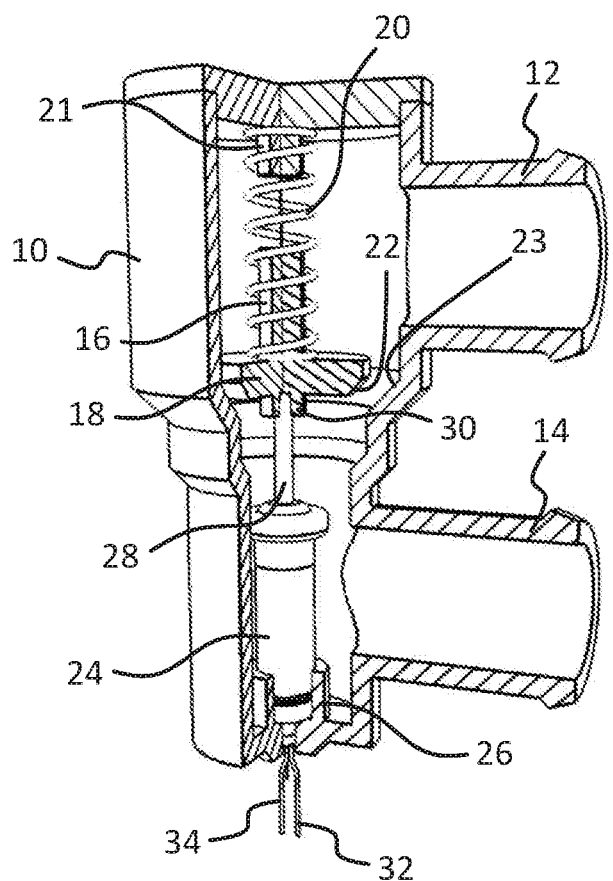
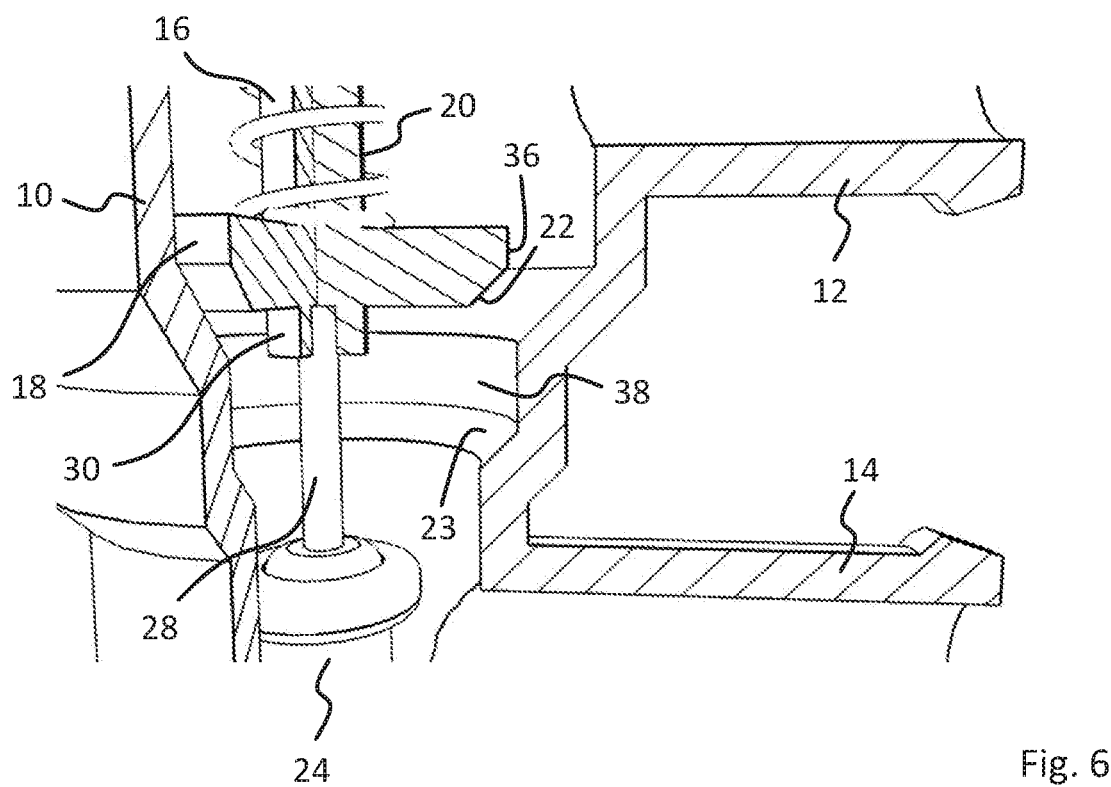
Fig. 5
Fig. 6

THERMOSTATIC VALVE FOR AN INTERNAL COMBUSTION ENGINE

TECHNICAL FIELD

The invention relates to a thermostatic valve for an internal combustion engine, of the valve type having a housing with a plurality of coolant connections for connection to a coolant circuit of the internal combustion engine and a valve element which is mounted movably in the housing such that by movement of the valve element, at least two coolant connections of the housing are either connectable to one another or separable from one another, where an expansion element is arranged in order, during the operation of the internal combustion engine, to enter into thermal contact with coolant circulating in the coolant circuit, and in the event of a heat-induced expansion, the expansion element moves the valve element in the housing in order to connect the at least two coolant connections.

BACKGROUND

Thermostatic valves are used for controlling the coolant circuit of internal combustion engines. It is known, for example from EP 2 529 937 B1, to provide a bypass line to a cooling line running through a cooler of the coolant circuit, wherein, in the cold starting phase of the internal combustion engine, coolant is guided by means of a thermostatic valve exclusively via the bypass in order to reach the operating temperature of the internal combustion engine as rapidly as possible. A thermostatic valve for controlling a coolant circuit with at least three coolant connections is also known from DE 10 2006 038 213 B4.

Thermostatic valves can be adjusted into the respectively desired switching position by a controllable drive, for example an electric drive. However, such drives are structurally complicated. It is therefore also known to activate thermostatic valves with what are referred to as expansion elements. The expansion elements exchange heat with a coolant guided through the coolant circuit, have, for example, the coolant flowing around them and comprise a material which expands upon heating. The expansion elements can then act, for example, eccentrically on a valve shaft of a spherical valve element, and therefore the expansion of the expansion element leads to rotation of the valve element and therefore to switching of the thermostatic valve.

Such expansion elements are structurally simple, and the thermostatic valve is automatically controlled on the basis of the coolant temperature. However, expansion elements are disadvantageous in that the thermostatic valve is activated only when there is a sufficient coolant temperature or flow of coolant around the thermostatic valve. For example, in the cold starting phase of an internal combustion engine, it is sometimes desirable to completely shut off at least one branch of the coolant circuit, i.e. to avoid a coolant flow through said branch, so that the internal combustion engine reaches its operating temperature even more rapidly. This refers in particular to the cooling line running through the engine block of the internal combustion engine. When a certain engine temperature is reached, it is furthermore sometimes desirable to first of all set a coolant flow having a very low flow rate and, as the coolant temperature rises further, to transfer to the regular thermostatic regulating mode with a correspondingly increased flow rate. For this purpose, DE 10 2012 013 677 A1 discloses a thermostatic valve in which, adjacent to a control opening of the valve element, a depression is formed in the lateral surface of the valve element, and therefore, upon a small rotation of the spherical valve element, a low flow of coolant via the depression initially takes place before the control opening comes to overlap the housing connection leading to the respective coolant line. With an expansion element, this activation for a low flow rate in the cold starting phase cannot always be realized in practice with the comparatively low coolant temperatures.

Added to this is the fact it is sometimes desirable, by means of the thermostatic valve, to open the flow of coolant through the engine block even when the coolant is still cold, for example by means of a demand from an engine control device, if a high engine power is required in the cold state of the internal combustion engine. This too cannot be satisfactorily realized with expansion elements since the latter require appropriate heat exchange with the coolant. However, such a heat exchange is generally not yet present to a sufficient extent in the cold starting phase.

SUMMARY

Starting from the explained prior art, the invention is therefore based on the object of providing a thermostatic valve of the type mentioned at the beginning, with which, even in the cold starting phase, an optionally also low flow rate can be realized in a structurally simple manner, for example when there is a slight rise in the temperature of the internal combustion engine or when a high engine power is briefly required in the cold starting phase.

The invention achieves the object by means of the subject matter of claim 1. Advantageous refinements are found in the dependent claims, the description and the figures.

The invention achieves the object in that a controllable heating device is provided by means of which the expansion element can be heated in order to move the valve element. Consequently, in the case of the invention, an expansion element continues to be used in a structurally simple manner for actuating the valve element. The expansion element exchanges heat in a manner known per se with a coolant guided through the coolant circuit during operation of the internal combustion engine. The expansion element can be arranged in particular in such a manner that the coolant flows around it during operation. In the invention, a separate heating device is provided for heating the expansion element irrespective of the temperature of the coolant. The expansion element can thereby be thermally expanded by means of the heating device even if the coolant does not flow through the coolant circuit or the coolant is still not at a sufficient temperature. As a result, in turn, actuation of the valve element for providing a coolant flow through the internal combustion engine, in particular the engine block of the internal combustion engine, is possible even in the cold starting phase, for example in order to provide a coolant flow when there is a small increase in temperature or when a high engine power is required in the cold starting phase. The invention therefore adds a control function to the expansion element in a structurally simple manner without giving up the structural and control advantages of the expansion element. This makes it possible to specifically actuate the thermostatic valve in the respectively desired manner even outside the working range of the expansion element. The heating device here provides heating power which can be regulated.

The valve element is generally prestressed, in particular spring-prestressed, into a defined operating position, for example a position separating the connection between a cooler of the coolant circuit and the engine block of the internal combustion engine. The expansion of the expansion element during heating and the resultantly caused movement of the valve element then take place counter to said spring prestress. The spring prestress can be provided by means of a spring, for example a helical spring.

The coolant can be in particular a cooling liquid, for example water. The coolant connections of the housing can accordingly be cooling liquid connections. The housing of the thermostatic valve according to the invention can comprise in particular, for example, two or three coolant connections or more than three coolant connections.

In a particularly practical manner, the heating device can be an electric heating device. The latter is distinguished by a simple and robust construction. In particular, heating wires can run through the expansion element and an electric voltage is applied to said heating wires in order to heat the expansion element.

The valve element can be a valve element which is axially displaceable in the housing, in particular a disk valve element, which is adjusted in the axial direction upon an expansion of the expansion element. The valve element can in particular have a valve disk which is arranged on a tappet which is mounted in an axially displaceable manner.

It is also possible that the valve element is a valve element which is mounted rotatably in the housing and has a spherical or spherical-segment-shaped lateral surface and a plurality of openings which are formed in the lateral surface and, by rotation of the valve element, are optionally connectable to one or more of the coolant connections of the housing. Optionally in addition, one or more axial valve openings can also be provided.

According to a further refinement, it can be provided that the valve element, over a first adjustment path in the housing starting from its closed position separating the connection between the at least two coolant connections, opens up a constant flow cross section between the at least two coolant connections, and that, during a movement, which takes place beyond the first adjustment path, in the housing, the valve element opens up a flow cross section between the at least two coolant connections, said flow cross section increasing until the valve element is completely open. Over the first adjustment path, the valve element provides a small opening cross section ("microflow"). The flow rate of coolant permitted by said opening cross section can be, for example, less than 0.5 liter/min, preferably less than 0.3 liter/min, furthermore preferably not more than 0.1 liter/min. For example, if the valve element is mounted in an axially displaceable manner, the first adjustment path can be a few millimeters, for example 2 to 10 millimeters. In the case of a spherical valve element, the adjustment path accordingly corresponds to an angle of rotation. Upon a further movement of the valve element beyond the first adjustment path, it is then possible, for example, for a stroke-proportional or angle-of-rotation-proportional increase in the opening cross section to occur up to a maximum opening cross section in the completely open position.

If the valve element is a valve element which is axially displaceable in the housing, said valve element or a valve disk of said valve element can have a conical valve surface which, in the closed position of the valve element, lies in a sealing manner against a conical valve seat of the housing. Furthermore, it is possible that the valve element which is axially displaceable in the housing has a cylindrical lateral surface, and that the housing has a cylindrical inner surface, wherein the cylindrical lateral surface of the valve element is located opposite the cylindrical inner surface of the housing and at a constant distance from the cylindrical inner surface of the housing at least over the first adjustment path. Between the mutually opposite cylindrical surfaces of valve element, in particular valve disk of the valve element, and housing, an annular gap is then formed which defines the opened-up flow cross section for the coolant. By the distance between the surfaces and therefore the cross section of the annular gap remaining constant at least over the first adjustment path, when the valve element lifts off from the valve seat a constant, low flow is initially achieved until said flow reaches its maximum when the valve element has completely lifted off.

By contrast, in the case of a spherical valve element, it can be provided that the lateral surface of the valve element has, adjacent to an opening bounded by said lateral surface, at least one depression opposite the surrounding surface area of the lateral surface, wherein the depression is designed in such a manner that, in the event of a rotation of the valve element in order to bring the at least one opening into overlap with one of the coolant connections of the housing, coolant can flow through the depression between the coolant connection of the housing and the opening even before the opening and the coolant connection of the housing overlap. Such a depression in a spherical valve element is known, for example, from DE 10 2012 013 677 A1, as explained at the beginning.

By means of the two aforementioned refinements, it is possible to specify a flow cross section, which is initially constant and small and is opened up over the first adjustment path, between the at least two coolant connections and, upon further movement of the valve element, to specify a flow cross section which increases until the valve element is completely open.

A control device for activating the heating device can furthermore be provided. The control device can be a control device provided especially for this purpose. However, it is also possible for it to be a control device which is present in any case, for example an engine control device of the internal combustion engine. The control device can also be formed by a regulating device.

Furthermore, the control device can be designed to activate the heating device in such a manner that the expansion element holds the valve element within the first adjustment path for a certain period of time. Said certain period of time can be, for example, a period of time which is defined in advance, after cold starting of the internal combustion engine. However, the certain period of time can also arise from a temperature specification which the internal combustion engine or the coolant conducted through the internal combustion engine has to reach. In this respect, the certain period of time can therefore depend on the operating conditions of the internal combustion engine, for example the external temperatures or the required engine power. It is also possible to already prestress the expansion element thermally via the heating device into a region shortly before the valve element is actuated for opening purposes. By further heating of the expansion element, the thermostatic valve can then be opened, optionally very rapidly, for example in order to set a low coolant flow (microflow).

The control device can furthermore be designed to activate the heating device in such a manner that the expansion element moves the valve element into the complete open position. In this refinement, the heating power of the heating device is therefore sufficient for a thermal expansion of the expansion element, said thermal expansion leading to complete opening of the thermostatic valve or to a maximum connection between the at least two coolant connections. Such an activation can take place, for example, after expiry of the abovementioned certain period of time. However, it can also take place independently of a previous holding of the valve element within the first adjustment path. In this manner, in the event of a rising coolant temperature and a thereby optionally also briefly arising requirement to bring the thermostatic valve into the thermostatic regulating mode, the thermostatic valve can be opened comparatively rapidly. This also increases the heat exchange of the expansion element, in particular the flow of coolant around the expansion element, and therefore, when the heating power subsequently drops, the regular thermostatic operation can take place, in particular in a manner controlled solely by the expansion element.

According to a further refinement, at least one position sensor can be provided for detecting the valve element position, wherein measured values of the at least one position sensor are applied to the control device, and wherein the control device activates the heating device on the basis of the measured values of the at least one position sensor.

Alternatively or additionally, at least one temperature sensor can be provided for (directly or indirectly) detecting the temperature of the expansion element, wherein measured values of the at least one temperature sensor are applied to the control device, and wherein the control device activates the heating device on the basis of the measured values of the at least one temperature sensor.

By means of such a position sensor or such a temperature sensor, the valve element position and therefore the respective switching state of the thermostatic valve can be directly or indirectly detected. A suitable position sensor is, for example, a contactless Hall sensor which detects the position of a magnet arranged on the valve element. If it is established on the basis of the position sensor or of the temperature sensor that the valve element, after moving out of the closed position, is located within the first adjustment path, the control device somewhat reduces the heating power of the heating device. When a position or a temperature is established in the vicinity of the closed position of the valve element, the heating power is correspondingly somewhat increased again. In this manner, the expansion element therefore produces a slight fluctuation of the valve element position. However, in particular if the opening cross section remains constant within the first adjustment path, the corresponding volumetric flow of coolant also remains constant. The valve element position is therefore easily regulated within the first adjustment path. For example, a two-point regulation which is known per se can be used. The functioning capability of the valve element can optionally also be checked on the basis of the sensors mentioned. Such data can be used for on-board diagnostics (OBD).

The invention also relates to an internal combustion engine comprising a thermostatic valve according to the invention. In particular, the internal combustion engine comprises a coolant circuit through which coolant is conducted during operation and in which a thermostatic valve according to the invention is arranged for controlling the coolant circuit.

BRIEF DESCRIPTION OF THE DRAWINGS

An exemplary embodiment of the invention is explained in more detail below with reference to figures, in which, schematically:

FIG. 5 shows the illustration from FIG. 1 in a third operating state, and FIG. 6 shows the illustration from FIG. 2 in the third operating state.

Figure 1:
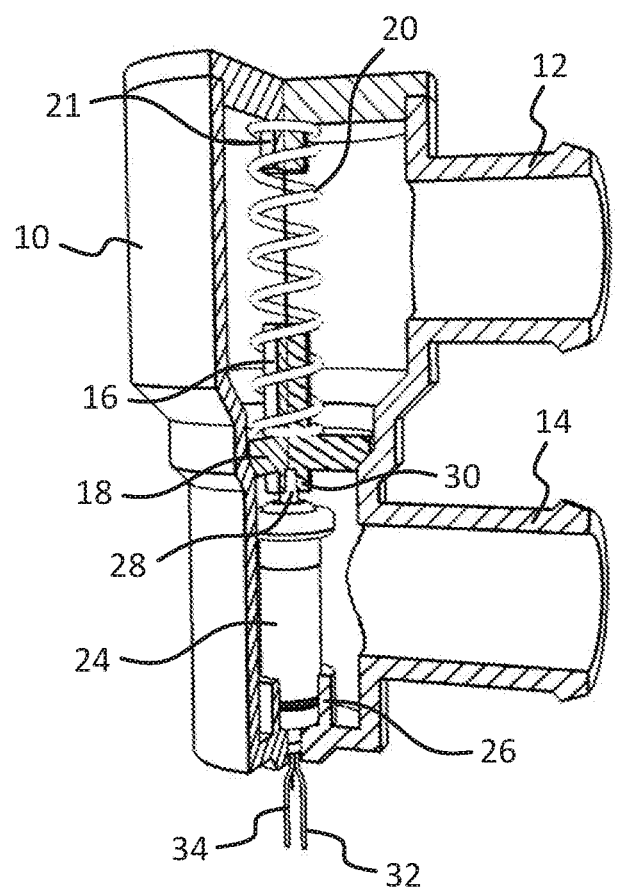
FIG. 1 shows a thermostatic valve according to the invention in a perspective section view in a first operating state.

Unless stated otherwise, the same reference signs denote the same objects in the figures.

DETAILED DESCRIPTION

The thermostatic valve shown in the figures for an internal combustion engine comprises a housing 10 which, in the example illustrated, has a first coolant connection 12 and a second coolant connection 14 for connection to a coolant circuit (not illustrated specifically) of the internal combustion engine. In the example illustrated, a valve element 16 which is mounted in an axially displaceable manner is arranged in the housing 10. The valve element 16 is a tappet valve element, in particular a disk valve element, wherein the valve disk is shown at the reference sign 18. A spring 20, in the example shown a helical spring 20, prestresses the valve element 16 into the closed position shown in FIGS. 1 and 2. For this purpose, the spring 20 is guided at one end around the tappet of the valve element 16 and is placed against the upper side of the valve disk 18, the upper side facing away from the expansion element 24. At the other end, the spring 20 is mounted on a projection 21 on the upper side of the housing 10.

Figure 2:
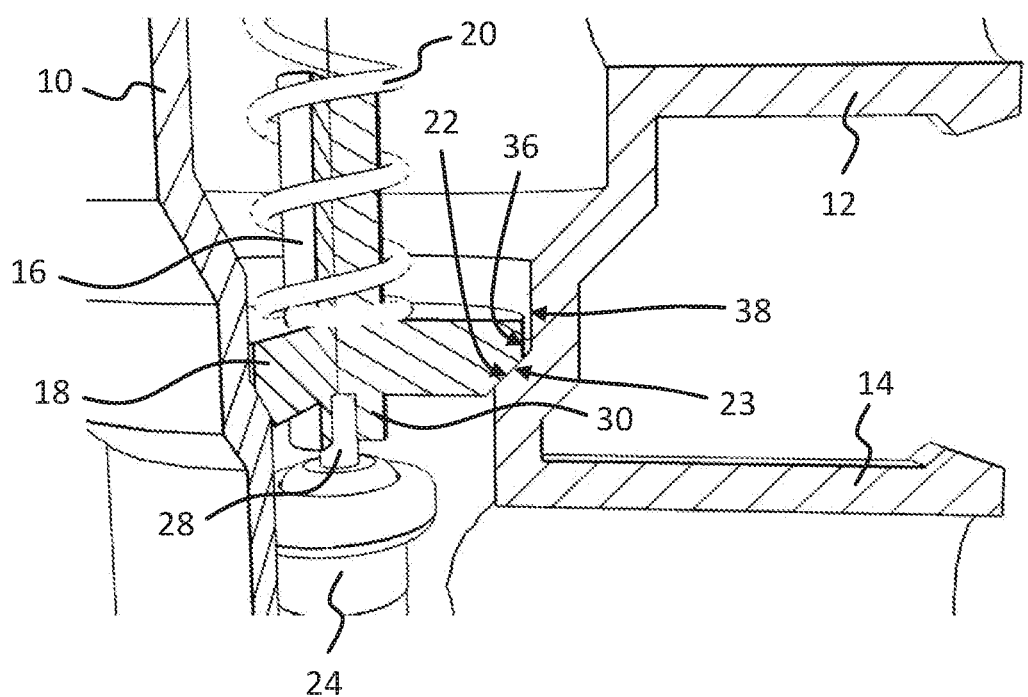
FIG. 2 shows an enlarged illustration of a cut-out from FIG. 1.

In the closed position shown in FIGS. 1 and 2, the valve disk 18 rests with a conical valve surface 22 on a conical valve seat 23 of the housing 10 (see in particular FIG. 2). The valve element 16 therefore separates the two coolant connections 12, 14 from each other. Furthermore, an expansion element 24 is arranged in the housing 10 of the thermostatic valve. The expansion element 24 has a basically cylindrical shape and is mounted at one end, the lower end in FIG. 1, fixedly in a hollow-cylindrical receptacle 26 of the housing 10. At its opposite end, the expansion element 24 has a tappet 28 which engages in a tappet receptacle 30 of the valve disk 18. In addition, two heating wires of an electric heating device for heating the expansion element 24 can be seen in FIG. 1 at the reference signs 32, 34. The heating wires 32, 34 are connected to an electric voltage source (not illustrated specifically). The electric voltage source in turn is activated by a control device (likewise not illustrated specifically). If, controlled via the control device, an electric voltage is applied to the heating wires 32, 34 by the electric voltage source, an electric current correspondingly flows through the heating wires 32, 34, said electric current leading to heating of the heating wires 32, 34. The heating wires 32, 34 run within the expansion element 24, and therefore the heat of the heating wires 32, 34 is transferred to the expansion element 24 for heating same.

Figure 3:
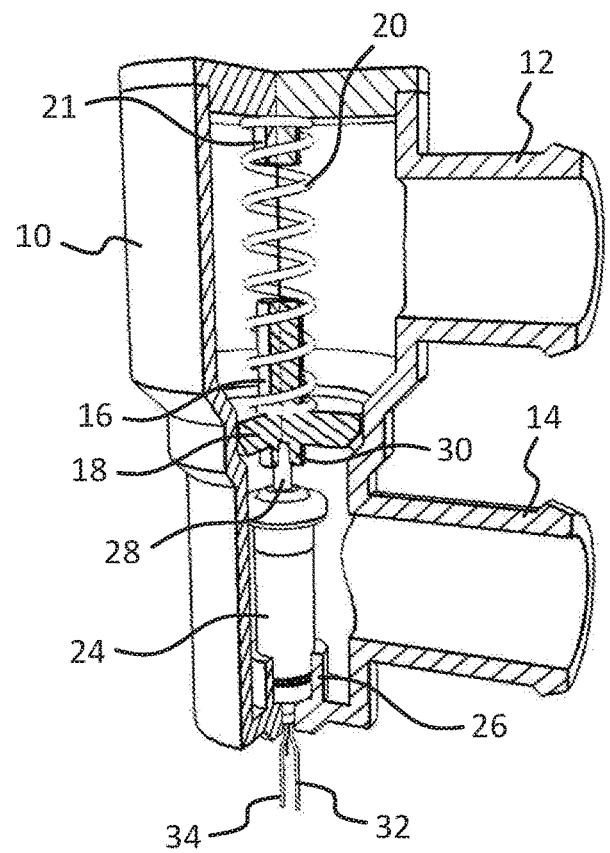
FIG. 3 shows the illustration from FIG. 1 in a second operating state.
Figure 4:
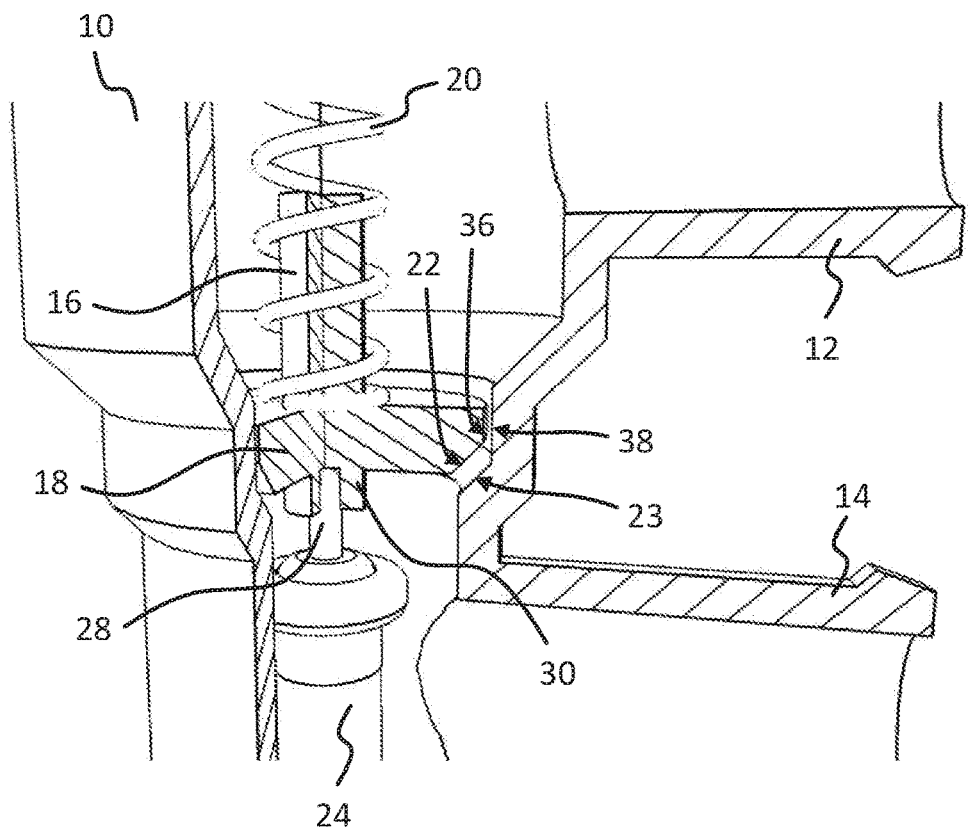
FIG. 4 shows the illustration from FIG. 2 in the second operating state.

As can be seen, for example, in FIG. 1, the expansion element 24 is arranged in the coolant channel formed by the coolant connection 14, and therefore the expansion element comes into contact with coolant located in said coolant channel. If, as shown in FIG. 1, the valve disk 18 rests on the valve seat 23 in a sealing manner, coolant does not flow past the expansion element 24. In particular, the expansion element 24 is insufficiently heated in order to thermally expand same in the cold starting phase of the internal combustion engine. In order nevertheless to be able to open the thermostatic valve in said cold starting phase, the electric heating device is activated, and therefore the expansion element 24 is heated via the heating wires 32, 34. The expansion element then expands and the tappet 28 pushes off the valve element 16 from the valve seat 23 counter to the spring prestress of the spring 20 first of all into a partially open position, as shown in FIGS. 3 and 4. Coolant can now flow through an annular gap between a cylindrical lateral surface 36 of the valve disk 18 and a cylindrical inner surface 38, which lies opposite the cylindrical lateral surface 36, of the housing 10. It can be seen in particular in FIG. 4 that said annular gap, which is provided as a flow cross section, between the valve disk 18 and the housing 10 remains constant over a first axial adjustment path of the valve element 16, namely for as long as the lateral surface 36 and the inner surface 38 lie opposite each other. Accordingly, the permitted coolant flow also remains constant over said adjustment path of the valve element 16, in the present case as a "microflow".

Position and/or temperature sensors (not illustrated specifically in the figures) can be provided for detecting the position of the valve element 16 or the temperature of the expansion element 24. On this basis, the control device can regulate the heating power of the heating wires 32, 34 in such a manner that the valve element 16 remains within the first adjustment path. This can be the case, for example, for a predetermined period of time. The heating power of the heating device can subsequently be increased further, as a result of which the expansion element is further expanded and therefore the valve disk 16 is lifted off further axially from the valve seat 23 counter to the spring prestress of the spring 20 into the complete open position which is shown in FIGS. 5 and 6 and in which a maximum flow cross section is provided between the coolant connections 12 and 14. The thermostatic valve can then transfer into the thermostatic regulating mode, in which the valve element position is regulated solely by means of the expansion element 24 owing to the thermal contact with the coolant now flowing between the coolant connections 12, 14. The heating power of the heating device can be correspondingly reduced and in particular lowered to zero.

LIST OF REFERENCE SIGNS

10 Housing
12 Coolant connection
14 Coolant connection
16 Valve element
18 Valve disk
20 Spring
21 Projection
22 Valve surface
23 Valve seat
24 Expansion element
26 Receptacle
28 Tappet
30 Tappet receptacle
32, 34 Heating wires
36 Lateral surface
38 Inner surface

The invention claimed is:

1. A thermostatic valve for an internal combustion engine, comprising a housing (10) with a plurality of coolant connections (12, 14) for connection to a coolant circuit of the internal combustion engine, furthermore comprising a valve element (16) which is mounted movably in the housing (10), wherein, by means of a movement of the valve element (16), at least two coolant connections (12, 14) of the housing (10) are either connectable to one another or separable from one another, furthermore comprising an expansion element (24) which is arranged in order, during the operation of the internal combustion engine, to enter into thermal contact with coolant circulating in the coolant circuit, wherein, in the event of a heat-induced expansion, the expansion element (24) moves the valve element (16) in the housing (10) in order to connect the at least two coolant connections (12, 14), wherein a controllable heating device (32, 34) is provided by means of which the expansion element (24) can be heated in order to move the valve element (16), wherein the valve element (16) is movable in the housing (10) between a closed position separating the connection between the at least two coolant connections (12, 14) and a completely open position, wherein, as the valve element (16) moves over a first adjustment path from the closed position to an intermediate position that is between the closed position and the completely open position, the valve element (16) opens up and maintains a constant flow cross section between the at least two coolant connections (12, 14), wherein, as the valve element (16) moves from the intermediate position to the completely open position, the valve element (16) further opens up a flow cross section between the at least two coolant connections (12, 14), said flow cross section increasing until the valve element (16) is in the completely open position.

2. The thermostatic valve as claimed in claim 1, wherein the heating device (32, 34) is an electric heating device (32, 34).

3. The thermostatic valve as claimed in claim 1, wherein the valve element (16) is a valve element (16) which is axially displaceable in the housing (10).

4. The thermostatic valve as claimed in claim 1, wherein the valve element (16) is a valve element which is mounted rotatably in the housing (10) and has a spherical or spherical-segment-shaped lateral surface and a plurality of openings which are formed in the lateral surface and, by rotation of the valve element, are connectable to one or more of the coolant connections of the housing.

5. The thermostatic valve as claimed in claim 1, wherein a control device for activating the heating device (32, 34) is furthermore provided.

6. The thermostatic valve as claimed in claim 5, wherein the control device is designed to activate the heating device (32, 34) in such a manner that the expansion element (24) moves the valve element (16) into the complete open position.

7. The thermostatic valve as claimed in claim 6, wherein at least one position sensor is provided for detecting the valve element position, wherein measured values of the at least one position sensor are applied to the control device, and wherein the control device activates the heating device (32, 34) on the basis of the measured values of the at least one position sensor.

8. The thermostatic valve as claimed in claim 7, wherein at least one temperature sensor is provided for detecting the temperature of the expansion element, wherein measured values of the at least one temperature sensor are applied to the control device, and wherein the control device activates the heating device on the basis of the measured values of the at least one temperature sensor.

9. An internal combustion engine comprising a thermostatic valve as claimed in claim 1.

10. A thermostatic valve for an internal combustion engine, comprising a housing (10) with a plurality of coolant connections (12, 14) for connection to a coolant circuit of the internal combustion engine, furthermore comprising a valve element (16) which is mounted movably in the housing (10), wherein, by means of a movement of the valve element (16), at least two coolant connections (12, 14) of the housing (10) are either connectable to one another or separable from one another, furthermore comprising an expansion element (24) which is arranged in order, during the operation of the internal combustion engine, to enter into thermal contact with coolant circulating in the coolant circuit, wherein, in the event of a heat-induced expansion, the expansion element (24) moves the valve element (16) in the housing (10) in order to connect the at least two coolant connections (12, 14), wherein a controllable heating device (32, 34) is provided by means of which the expansion element (24) can be heated in order to move the valve element (16), wherein the valve element (16), over a first adjustment path in the housing (10) starting from its closed position separating the connection between the at least two coolant connections (12, 14), opens up a constant flow cross section between the at least two coolant connections (12, 14), and in that, during a movement, which takes place beyond the first adjustment path, in the housing (10), the valve element (16) opens up a flow cross section between the at least two coolant connections (12, 14), said flow cross section increasing until the valve element (16) is completely open;

wherein the valve element (16) is axially displaceable in the housing (10), wherein the valve element (16) has a cylindrical lateral surface (36), and wherein the housing (10) has a cylindrical inner surface (38), wherein the cylindrical lateral surface (36) of the valve element (16) is located opposite the cylindrical inner surface (38) of the housing (10) and at a constant distance from the cylindrical inner surface (38) of the housing (10) at least over the first adjustment path.

11. A thermostatic valve for an internal combustion engine, comprising a housing (10) with a plurality of coolant connections (12, 14) for connection to a coolant circuit of the internal combustion engine, furthermore comprising a valve element (16) which is mounted movably in the housing (10), wherein, by means of a movement of the valve element (16), at least two coolant connections (12, 14) of the housing (10) are either connectable to one another or separable from one another, furthermore comprising an expansion element (24) which is arranged in order, during the operation of the internal combustion engine, to enter into thermal contact with coolant circulating in the coolant circuit, wherein, in the event of a heat-induced expansion, the expansion element (24) moves the valve element (16) in the housing (10) in order to connect the at least two coolant connections (12, 14), wherein a controllable heating device (32, 34) is provided by means of which the expansion element (24) can be heated in order to move the valve element (16), wherein the valve element (16), over a first adjustment path in the housing (10) starting from its closed position separating the connection between the at least two coolant connections (12, 14), opens up a constant flow cross section between the at least two coolant connections (12, 14), and in that, during a movement, which takes place beyond the first adjustment path, in the housing (10), the valve element (16) opens up a flow cross section between the at least two coolant connections (12, 14), said flow cross section increasing until the valve element (16) is completely open;

wherein a control device for activating the heating device (32, 34) is provided, wherein the control device is designed to activate the heating device (32, 34) in such a manner that the expansion element (24) holds the valve element (16) within the first adjustment path for a certain period of time.

\* \* \* \* \*